June 9, 1959 — W. F. CURTIS — 2,890,091
ULTRA HIGH SPEED LEVEL RECORDER
Filed March 4, 1955 — 3 Sheets-Sheet 1
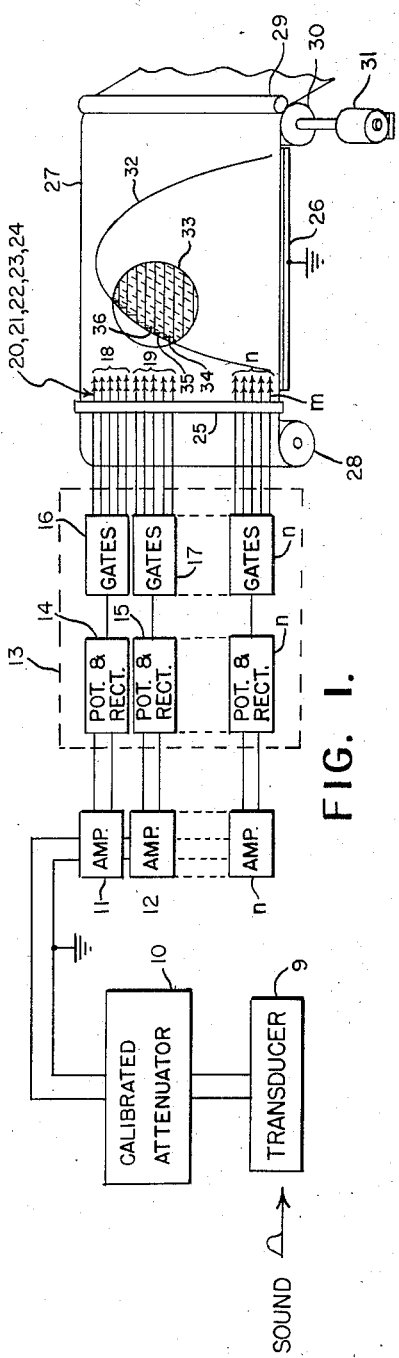
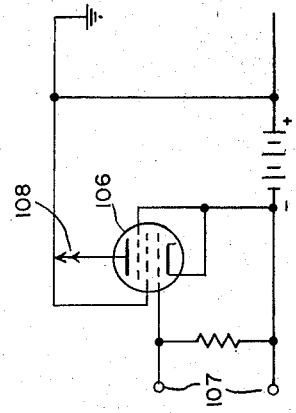
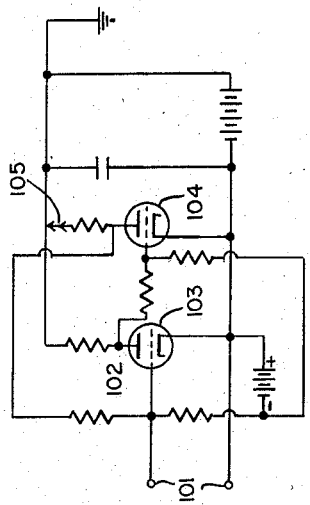
INVENTOR
WESTLEY F. CURTIS
BY
ATTORNEYS June 9, 1959  W. F. CURTIS  2,890,091
ULTRA HIGH SPEED LEVEL RECORDER
Filed March 4, 1955  3 Sheets-Sheet 2

INVENTOR
WESTLEY F. CURTIS
BY George Sipkin
B. L. Zangwill
ATTORNEYS

United States Patent Office 2,890,091
Patented June 9, 1959

2,890,091
ULTRA HIGH SPEED LEVEL RECORDER
Westley F. Curtis, Washington, D.C.

Application March 4, 1955, Serial No. 492,324

5 Claims. (Cl. 346—35)

(Granted under Title 35, U.S. Code (1952), sec. 266)

The invention described herein may be manufactured and used by or for the Government of the United States of America for governmental purposes without the payment of any royalties thereon or therefor.

The present invention relates to an ultra high speed level recorder and more particularly to an ultra high speed level recorder having a plurality of stationary styluses.

Heretofore recorders have employed styluses designed for movement transverse of a moving chart and adapted to follow an input voltage indicative of some variable to be recorded. Although various methods have been employed for making the stylus follow the input voltage with the requisite rapidity, none of these methods will respond as rapidly as is desirable in many instances. Further, in all of those devices wherein the stylus is required to follow the input voltage, mechanical difficulties frequently occur, such as sticking, sluggish action, etc., and all require frequent repair and attention.

The instant recorder avoids the disadvantages of the prior art by using no moving parts other than those required to move the chart on which the record is made, thereby enabling more efficient and more rapid recording. This is accomplished by providing a multiplicity of stationary styluses adapted to mark a moving record chart. The styluses are energized individually through control circuits, the time constants of which may be adjusted to enable the recording of extremely high speed phenomena in detail or to enable recording the average input, the individual styluses being progressively energized in accordance with any desired predesigned response, e.g. a logarithmic, linear or square law response as determined by the design of the control circuit. The styluses are energized if and only when a predetermined potential exists in said control circuits. The result is such that each stylus is caused to make a mark on the moving chart corresponding to a particular portion of the input. The cumulative effect of all the styluses is a graphical record of the variation of the input as a function of time.

The recorder is able to record a wide range of input signals without suffering from harmful saturation by dividing the styluses and their associated gating circuits into groups adapted to handle only a portion of the total range. Each of the stylus groups are fed from a different stage of a cascaded amplifier. As will be seen from the description of the figures the stylus groups which mark the lowermost sections of the chart i.e. the groups recording the low voltage portions of the input waveform are connected to the final stages of the amplifier so that if these stages are caused to go to saturation upon application thereto of the high voltage portions of the input it will not matter inasmuch as said styluses will already have been actuated by the lowermost portions of said input waveform which are amplified in the final stages without saturation, thereby determining the shape of the input. In this way saturation of the amplifiers is rendered harmless because each group handles only a predetermined portion of the total range as determined by the control circuit of each group.

An object of the invention is to provide a high speed recorder having a plurality of stationary styluses capable of recording a wide range of input signals.

Another object of the invention is to provide a high speed recorder adapted to record extremely high speed phenomena or to average the input.

A further object of the invention is to provide a high speed level recorder having control circuits which are designed so that the recorder may have any desired response.

Still another object of the invention is to provide a high speed recorder which utilizes a minimum of moving parts.

Other objects and many of the attendant advantages of this invention will be readily appreciated as the same becomes better understood by reference to the following detailed description when considered in connection with the accompanying drawings wherein:

Fig. 1 shows the overall arrangement of the recorder in block diagram form with a representation of a recording on the chart paper and an exploded portion thereof;

Figs. 6 and 7 show schematic diagrams of alternative stylus control circuits utilizable with Fig. 5.

Figure 2:
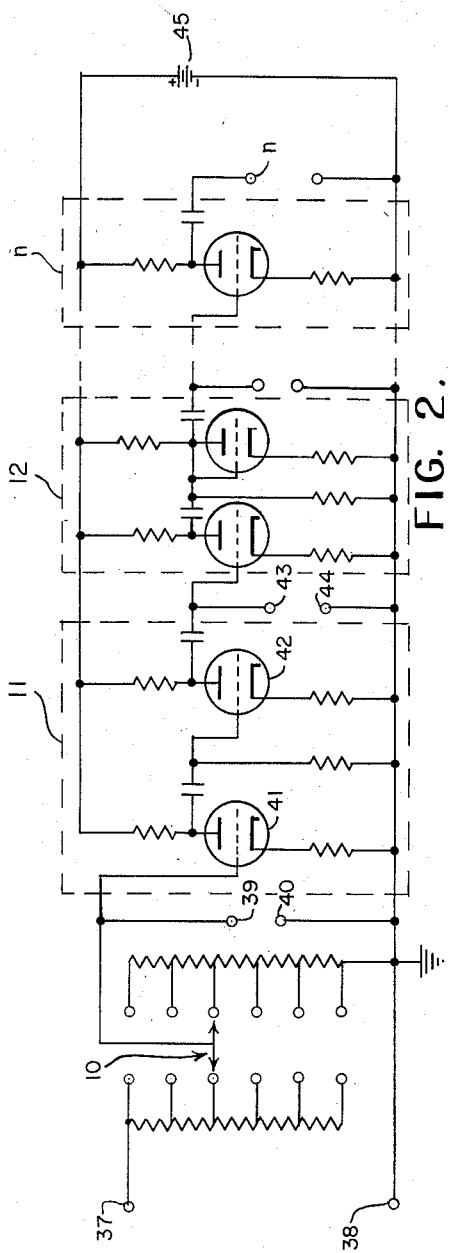
Fig. 2 shows a schematic diagram of a calibrated attenuator and cascaded amplifiers.

Referring now to the drawings wherein like reference characters designate like or corresponding parts throughout the several views, there is shown in Fig. 1 a wide range recorder comprising a transducer 9 for converting a quantity such as a sonic emanation into a varying electric voltage. Connected to the output of the transducer is a calibrated attenuator 10 adapted to adjust the input voltage to values such that high intensity signals may be scaled down to values capable of being handled by the equipment and presented within the range of the chart paper. The output of the calibrated attenuator is coupled to a plurality of cascaded R-C coupled voltage amplifiers 11, 12, . . . n. The individual outputs of the amplifiers are coupled to a control circuit 13 comprising a plurality of potentiometer and rectifier circuits 14, 15 . . . n and a plurality of gating groups 16, 17 . . . n. Each individual potentiometer and rectifier circuit is connected to the output of an amplifier and to an individual group of the gating circuits 16, 17 . . . n associated therewith which control the input currents to their respective groups of stationary styluses 18, 19 . . . n in accordance with any desired predesigned response as for example a logarithmic response (shown on chart), a linear response, or a square law response.

The individual styluses 20, 21, 22, 23, 24 . . . m are mounted on an insulating support 25 and may be simple rods ending in a round point and actuated by solenoids so that they might write on carbon backed paper when current flows through the solenoid, or they might contain small heating coils which would mark on wax paper or chemically treated heat sensitive paper. The preferred embodiment however utilizes point electrodes cooperating with a grounded support 26 to mark electro-chemical paper 27. Electro-chemical paper is shown unrolling from a roll 28 being driven by rolls 29 and 30 which in turn are driven by a constant speed motor 31. On the chart 27 which represents output from the transducer versus time there is illustrated the manner in which the record is made. A recorded input waveform 32 is shown with an exploded portion 33 showing the marks 34, 35, 36, . . . made by each stylus. These marks or traces represent a predetermined decibel step which is indicative of only a portion of the input variation. As is evident from the illustrated recording the cumulative action of all the styli, in accordance with one modification, completely shades in the area under the line representing the input variation.

Figure 3:
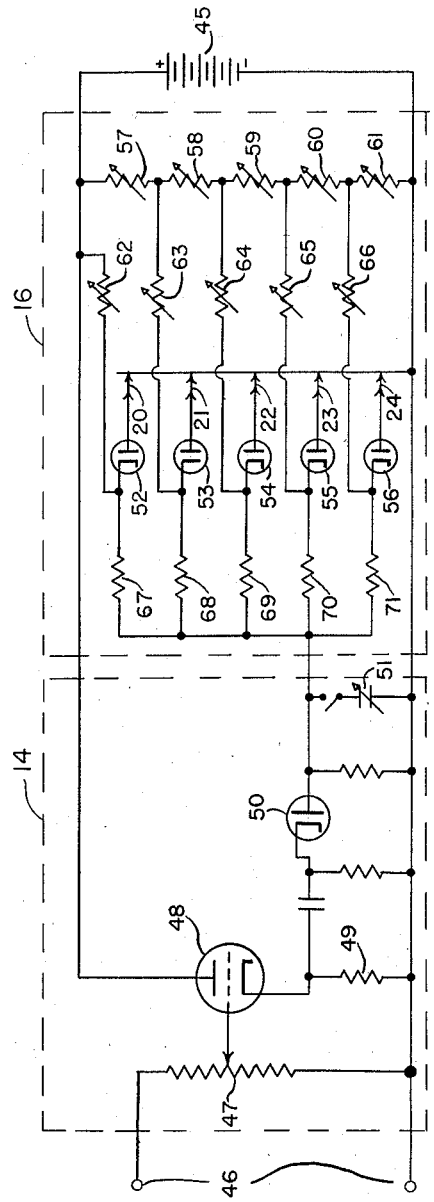
Fig. 3 shows a schematic diagram of half wave rectifying and gating circuits.

Referring more particularly to Fig. 2 the signal from the transducer 9 is applied to terminals 37, 38 and through a calibrated attenuator 10. After attenuation to an amount determined by the range of recordings desired the signal is applied first to output terminals 39, 40, from whence it is applied to a circuit as shown in Fig. 3 if the input signal is of a sufficient magnitude to be recorded without amplification or if a rough reproduction of the input signal is all that is required. If a sensitive reproduction of large amplitude inputs is required the signal is applied to voltage amplifiers 41, 42, to output terminals 43, 44, and to further amplifier stages and outputs and so on, to as many as is required for a desired sensitivity. All the amplifiers are connected to a common power supply 45. Each amplifier handles a predetermined range e.g. if a 40 db range is desired, 8 stages of amplification each having a gain of 5 db could be provided. Connected to the output terminals, 43, 44 . . . $n$ are rectifier and gating circuits as shown in Fig. 3 each adapted to record only a portion of the input. The amplified signals are fed to input terminals 46 leading to potentiometers or voltage dividers 47 whose function is to divide the amplified signal voltages to a value determined by the db range its particular group of styluses is designed to handle.

As shown in Fig. 3 the potentiometer output is applied to a cathode follower stage 48 to obtain a proper impedance match. The voltage output across cathode resistor 49 is rectified by a halfwave rectifier 50 with a shunt capacitor filter 51. The rectified signal proceeds to stylus gating circuits which are composed of rectifiers 52, 53, 54, 55 and 56. These gating rectifiers control the input currents to styluses 20, 21 . . . 24 and bias is applied thereto through adjustable resistors 57–61, connected across common B supply 45 and adjustable resistors 62–66. By properly adjusting the values of these resistors the bias on the rectifiers 52–56 may be made such that conduction of the rectifiers through the styluses 20–24 can be made to follow any desired response law i.e. linear, square law or logarithmic response. The latter is the preferred and hence the values of the biasing resistors 57–66 are adjusted, so that, to make one more stylus conduct there must be a certain number of decibels increase in the input voltage regardless of the number of styli marking at that time, i.e. the voltage necessary to make one more stylus conduct to obtain a logarithmic response (db) is determined by $$db = 20 \log_{10} \frac{E_2}{E_1}$$

With this arrangement a particular range of input signals may be recorded in discrete db steps. These steps 34, 35, 36 (Fig. 1) may be adjusted to obtain any desired sensitivity by designing the values of the biasing resistors 57–66 so that the voltage drops across successive resistors will be in a ratio to each other such as to enable each of the styluses to mark a predetermined portion of the db range for which the recorder is designed.

Figure 4:
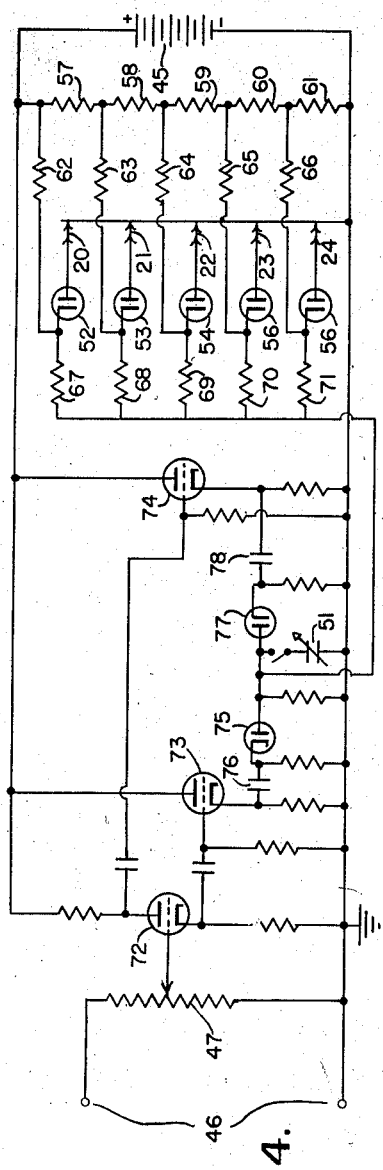
Fig. 4 shows a schematic diagram of full wave rectifying and gating circuits.

Fig. 4 is similar to Fig. 3 except that it utilizes a full wave rectifier. In Fig. 4 the signal from input terminals is led through voltage divider 47 as in Fig. 3 and to a phase inverter tube 72 which supplies two cathode followers 73 and 74. The cathode followers supply rectifier 75 through condenser 76 and rectifier 77 through condenser 78. It will be seen that this arrangement constitutes a full wave rectifier. The remainder of Fig. 4 is the same as that shown in Fig. 3. The circuit of Fig. 4 is used with asymetric wave form inputs as the device of Fig. 3 will cause wave form errors when used with asymetric wave inputs.

In both Figs. 3 and 4 all the rectifiers are shown as of the thermionic type so that the direction of rectification is apparent; actually, germanium or silicon rectifiers or any other type may be used for the gating rectifiers but thermionic rectifiers are preferred for the A.C. rectifiers.

The filter capacitor 51 may be switched in or out of the circuit depending on whether a recording of the average or the peak value of the input is desired and may also be varied to control the conduction angle of the diode to thereby increase the efficiency of rectification and to enable the recording of extremely high-speed phenomena.

Figure 5:
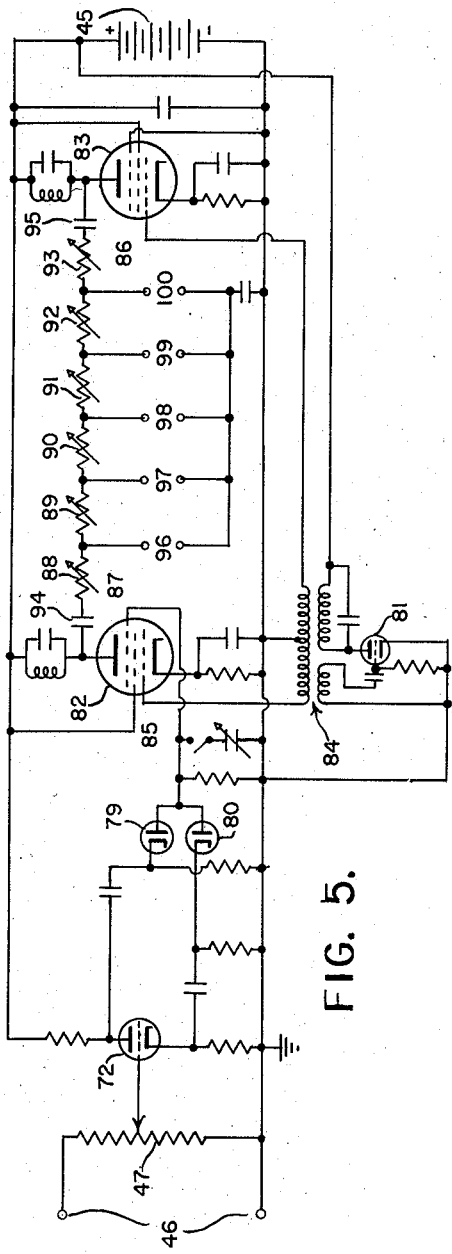
Fig. 5 shows a schematic diagram of a modification of the rectifying and gating circuits.

Fig. 5 shows a modification of the rectifying and gating circuits which may be used across output terminals 39, 40, 43, 44 . . . $n$ of Fig. 2 in place of the rectifier and gating circuits of Fig. 3 or 4. As before the output of the amplifiers is fed to the terminals of a voltage divider 47 and the signal therefrom is applied to the grid of a phase inverter 72 as in Fig. 4. The rectifiers 79, 80 are coupled through condensers and work into a high impedance load so that cathode followers are not necessary. An oscillator 81 feeds a modulator 82 and an amplifier 83 through a transformer 84 arranged so that the voltage supplied the control grid 85 of the modulator is opposite in phase to that supplied the control grid 86 of amplifier 83. The output of rectifiers 79 and 80 is used to modulate the carrier supplied to grid 85 from oscillator 81 and is applied to suppressor grid 87.

Resistors 88–93 connected through condensers 94 and 95 to the plate circuits of 82 and 83 are similar in their action to a bridge circuit; e.g. assuming no signal input to the suppressor grid 87, the output of modulator 82 and amplifier 83 being in phase opposition would cancel at the junction of resistors 90 and 91 resulting in a point of zero or minimum potential. Now assuming an input to the suppressor grid 87, the amplitude of the output of the modulator 82 would be changed and therefore the output of modulator 82 and amplifier 83 would cancel or be a minimum at a different junction point along resistors 88–93. Hence by choosing the values of resistors 88–93 in accordance with the desired law of response, i.e. logarithmic, linear or square law the point of zero or minimum potential may be made to shift from terminals 96 through terminals 100 in accordance with the signal applied to grid 87.

Stylus circuits shown in Fig. 6 or 7 are connected across terminals 96–100 of Fig. 5. These circuits are designed such that when the carrier frequency output is zero the stylus is actuated. In Fig. 6 a trigger circuit is shown having input terminals 101, the signal is applied to grid 102 of triode 103. Triode 103 is normally nonconducting and triode 104 is normally conducting. Hence if terminal 101 is not connected across a zero potential point triode 103 will conduct and cut off triode 104 thereby inactivating the stylus 105 in the plate circuit of triode 104.

Fig. 7 is a modification of the stylus control circuit of Fig. 6. Pentode 106 is a grid detector having zero grid bias and having a sharp cut off characteristic. When terminals 107 are connected across a zero potential point tube 106 is conducting and the stylus 108 marks when a signal is applied to the grid conduction ceases and the stylus is inactivated.

The modification of Figs. 5–7 does not shade the area under the line representing the input variation but traces only the line variation.

In operation the amplification to the terminals 46 (Figs. 3, 4 or 5) of the control circuits and the setting of the voltage dividers 47 therein are adjusted so that the relative sensitivity of the different groups of styluses is suitable for the response law desired and the relative sensitivity of the individual styluses in a group is adjusted by the biasing resistors 57–66 (Figs. 3 and 4) or 88–93 (Fig. 5). With this arrangement of amplifiers and voltage dividers large inputs capable of saturating the later stages of the amplifier can be permitted without harm because the styluses actuated by the later stages are marking the low voltage portions of the input, determining the line variation thereof and the effect of the high voltage portions on these later stages although capable of saturating them has no effect on the line between the marked and unmarked portions of the record. The earlier stages feeding the styluses which mark the higher voltage portions of the input will not be saturated by large inputs as the signal has not been amplified as much as when it reaches the later stages. Hence the cooperation between the amplifiers and control circuits insures a wide range of recording without distorting the significant portion of the record i.e. the line between marked and unmarked portions of the chart paper. Hence it can be seen that each stylus from the bottom to the top of the chart paper progressively marks one after the other as the input voltage increases a predetermined amount thereby allowing the rapid recording of a wide range of input signals.

Obviously many modifications and variations of the present invention are possible in the light of the above teachings. It is therefore to be understood that within the scope of the appended claims the invention may be practiced otherwise than as specifically described.

What is claimed is:

1. A wide range recorder having an input circuit, a plurality of cascaded voltage amplifiers coupled to said input circuit for amplifying a signal voltage, means for selecting successive predetermined voltage ranges of said amplified voltages connected to each amplifier, a plurality of gating circuits connected to each of said selecting means, means in said gating circuits for predetermining the voltages within said predetermined ranges required to progressively open said gating circuits, and a plurality of spaced styluses connected to said gating circuits responsive to currents passed by said gating circuits to mark a moving chart, said styluses marking the low voltage and upper voltage ranges of said signal voltage being operatively connected to the final amplifier and to the initial amplifier respectively of said plurality of cascaded amplifiers whereby highly amplified signal voltages may be recorded with negligible distortion.

2. A high speed recorder for recording a wide range of signals comprising a plurality of cascaded voltage amplifiers adapted to amplify said signals, means connected to the output of each of said amplifiers for passing only predetermined amplitude ranges of said signal, a plurality of gating circuits connected to each of said means, means in said gating circuits for determining the potentials in said predetermined ranges required to open said gating circuits, and a plurality of stationary styluses connected to said gating circuits to mark a movable chart when said gating circuits are open.

3. The invention set forth in claim 2, wherein said gating circuits include a plurality of rectifiers and said means are impedances biasing said rectifiers in accordance with a predetermined response characteristic.

4. The invention as set forth in claim 2 wherein said gating circuits comprise an oscillator, a modulator coupled to the output of said rectifying means and to said oscillator, a circuit having two input terminals and a plurality of output terminals, an amplifier coupled to said oscillator and to one of said input terminals, said modulator output coupled to the other input terminal, the output of said modulator and amplifier being opposite in phase, and wherein said circuit comprises impedances serially connected between said input terminals, the junction of said impedances forming said plurality of output terminals.

5. An ultra high speed recorder for recording a wide range of input signals having an amplifier for amplifying said signals, a control circuit coupled to said amplifier comprising a rectifier having a reactance shunted load, means for varying said reactance to control the time constant of said circuit whereby high frequency input signals may be recorded, a plurality of gating circuits adjusted to pass current whenever the output of said control circuit is within a particular range of a succession of predetermined voltage ranges, and a plurality of stationary styluses to mark a movable chart one after the other as said gating circuits pass current.

References Cited in the file of this patent
UNITED STATES PATENTS

| | | |
|---|---|---|
| 2,529,666 | Sands | Nov. 14, 1950 |
| 2,636,983 | Poole | Apr. 28, 1953 |
| 2,639,209 | Gamarekian | May 19, 1953 |
| 2,653,231 | Cooke-Yarborough | Sept. 22, 1953 |
| 2,659,651 | Benno | Nov. 17, 1953 |
| 2,676,206 | Bennett et al. | Apr. 20, 1954 |